(12) United States Patent
Farkas et al.

(10) Patent No.: US 10,917,143 B2
(45) Date of Patent: *Feb. 9, 2021

(54) SYSTEMS AND METHODS FOR CREATING NON-ORTHOGONAL DIMENSIONALITY BETWEEN SIGNALS IN ELECTRONIC DEVICES

(71) Applicant: COLLISION COMMUNICATIONS, INC., Peterborough, NH (US)

(72) Inventors: Joseph Farkas, Merrimack, NH (US); Jared Fry, Boston, MA (US); Barry West, Temple Hill, NH (US)

(73) Assignee: COLLISION COMMUNICATIONS, INC., Peterborough, NH (US)

( * ) Notice: Subject to any disclaimer, the term of this patent is extended or adjusted under 35 U.S.C. 154(b) by 639 days.

This patent is subject to a terminal disclaimer.

(21) Appl. No.: 14/733,141

(22) Filed: Jun. 8, 2015

(65) Prior Publication Data
US 2015/0270878 A1    Sep. 24, 2015

Related U.S. Application Data

(63) Continuation of application No. 13/900,897, filed on May 23, 2013, now Pat. No. 9,055,579.
(Continued)

(51) Int. Cl.
*H04B 7/0413*   (2017.01)
*H04B 15/00*    (2006.01)
(Continued)

(52) U.S. Cl.
CPC ........... *H04B 7/0413* (2013.01); *H04B 15/00* (2013.01); *H04J 11/003* (2013.01); *H04L 1/0025* (2013.01); *H04L 1/0036* (2013.01); *H04L 1/06* (2013.01); *H04L 5/0062* (2013.01); *H04L 5/0092* (2013.01); *H04W 72/042* (2013.01)

(58) Field of Classification Search
CPC .... H04L 1/0026; H04B 7/0413; H04B 7/0452
See application file for complete search history.

(56) References Cited

U.S. PATENT DOCUMENTS 7,289,776 B2    10/2007    Matsuoka et al.
2002/0037061 A1*  3/2002   Learned ............... H04L 1/0054
                                                    375/346
(Continued)

OTHER PUBLICATIONS

L. Yang, E. Alsusa, U. P. Rico and E. S. Navarro, "Linear Selective Channel Inversion Technique for Multi-User MIMO Systems," 2010 IEEE 72nd Vehicular Technology Conference—Fall, Ottawa, ON, 2010, pp. 1-5, doi: 10.1109/VETECF.2010.5594135. (Year: 2010).*

*Primary Examiner* — Ross Varndell
(74) *Attorney, Agent, or Firm* — NK Patent Law

(57) ABSTRACT

Systems and methods for creating non-orthogonal dimensionality between signals are disclosed. Signals are received from at least one electronic device. An adjustment of a parameter of a received signal of a first device of the at least one of the electronic device that would result in an adjusted signal that is not orthogonal but differentiates the signal from at least one other signal of the received signals is determined. An instruction is communicated to the first device to implement the adjustment of the parameter.

3 Claims, 9 Drawing Sheets

Related U.S. Application Data

(60) Provisional application No. 61/650,715, filed on May 23, 2012.

(51) Int. Cl.
*H04W 72/04* (2009.01)
*H04J 11/00* (2006.01)
*H04L 5/00* (2006.01)
*H04L 1/00* (2006.01)
*H04L 1/06* (2006.01)

(56) References Cited

U.S. PATENT DOCUMENTS

| | | | |
|---|---|---|---|
| 2002/0097810 A1* | 7/2002 | Seki | H04L 27/3809 375/295 |
| 2003/0125040 A1* | 7/2003 | Walton | H04B 7/0417 455/454 |
| 2005/0094713 A1* | 5/2005 | Yellin | H04B 1/7103 375/148 |
| 2007/0019536 A1* | 1/2007 | Hamalainen | H04B 7/0619 370/203 |
| 2007/0109954 A1* | 5/2007 | Pasanen | H04B 7/0413 370/204 |
| 2009/0010244 A1* | 1/2009 | Laroia | H04L 5/0007 370/350 |
| 2009/0175363 A1 | 7/2009 | Hottinen et al. | |
| 2010/0113051 A1* | 5/2010 | Du | H04W 72/1278 455/450 |
| 2010/0189049 A1 | 7/2010 | Lim et al. | |
| 2011/0268203 A1 | 11/2011 | Chockalingam et al. | |
| 2012/0045014 A1* | 2/2012 | Damnjanovic | H04L 5/001 375/295 |

* cited by examiner

SYSTEMS AND METHODS FOR CREATING NON-ORTHOGONAL DIMENSIONALITY BETWEEN SIGNALS IN ELECTRONIC DEVICES

RELATED APPLICATIONS

This application is a continuation of U.S. Pat. No. 9,055,579 titled "SYSTEMS AND METHODS FOR CREATING NON-ORTHOGONAL DIMENSIONALITY BETWEEN SIGNALS IN ELECTRONIC DEVICES," filed on May 23, 2013, which claims priority to and the benefit of U.S. Provisional Patent Application No. 61/650,715, file May 23, 2012, the entire disclosure of each of which is hereby incorporated by reference.

BACKGROUND

Receivers in communications systems traditionally were not designed to handle any interference, i.e. they were single user receivers. Since the receiver could not handle interference, communication systems were designed to avoid interference. This typically has been accomplished through the orthogonal scheduling of transmitting users and as part of multiple-access communication schemes, such as FDMA, TDMA, and CDMA, where it is intended to direct users to transmit in a non-interfering or orthogonal manner.

Interference can come in a number of different forms, both internal and external to the communication system. In a cellular communications environment there may be intercellular interference, i.e., interference that is caused by transmitters of a different, usually adjacent, cell. In addition, there may be intracellular interference, i.e., interference that is caused by transmitters of the same cell. In addition to scheduling and multiple access schemes to try and prevent interference, power control techniques are used in a variety of ways to improve the performance of the communication systems. Commonly, power control is used to reduce the effects of intercellular and intracellular interference, and more specifically "near-far" problems, by coordinating transmitters, to transmit such that their powers are nearly the same as received by the receiver, and as such, one transmission is not obfuscating another because it is received at such a greater power.

However, due to the demand for higher spectral efficiency, interference and receivers that can handle interference have become increasingly important, most notably receivers with Multi-User Detection capabilities.

Multi-User Detection (MUD) works by exploiting dimensionality between multiple interfering signals. The dimensionality may occur naturally between interfering signals but may also, as an aspect of the subject matter described herein, be purposely introduced in order to create advantageous situations for the MUD. The dimensionality can take the form of any difference between the received signals that can be exploited by the MUD to more reliably decode the interfering signals. Techniques to create orthogonal dimensionality between signals by design are widely employed with varying multiple access schemes, such as TDMA, FDMA, CDMA, and OFDMA. However networks do not attempt to direct a transmitter in real time to adjust transmit parameters in order to create the dimensionality between interfering signals short of scheduling an interfering transmitter to transmit at a different orthogonal non-interfering time-slot or frequency.

Multiple-input and multiple-output (MIMO), generally speaking, involves the use of multiple antennas at both the transmitter and receiver to improve communication performance. MIMO technology offers significant increases in data throughput and link range without additional bandwidth or increased transmit power. It achieves this goal by spreading the same total transmit power over the antennas to achieve an array gain that improves the spectral efficiency and/or to achieve a diversity gain that improves the link reliability. MIMO results in multiple signals that must be decoded and therefore can benefit from exploiting dimensionality between the multiple signals.

Although techniques have been provided to handle interference, it is desired to provide improved techniques for both managing interfering signals and better utilizing available resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to an aspect, a method for creating non-orthogonal dimensionality between signals is disclosed. Signals are received from at least one electronic device. An adjustment of a parameter of a received signal of a first device of the at least one of the electronic device that would result in an adjusted signal that is not orthogonal but differentiates the signal from at least one other signal of the received signals is determined. An instruction is communicated to the first device to implement the adjustment of the parameter.

According to an aspect, a method an electronic device includes at least a processor and memory configured to: receive signals from at least one electronic device; determine an adjustment of a parameter of a received signal of a first device of the at least one of the electronic device that would result in an adjusted signal that is not orthogonal but differentiates the signal from at least one other signal of the received signals; and communicate, to the first device, an instruction to implement the adjustment of the parameter.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

It should also be understood that the various system components defined by the claims, described below, and illustrated in the various block diagrams represent logical components that are configured to perform the functionality described herein. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

Figure 1A:
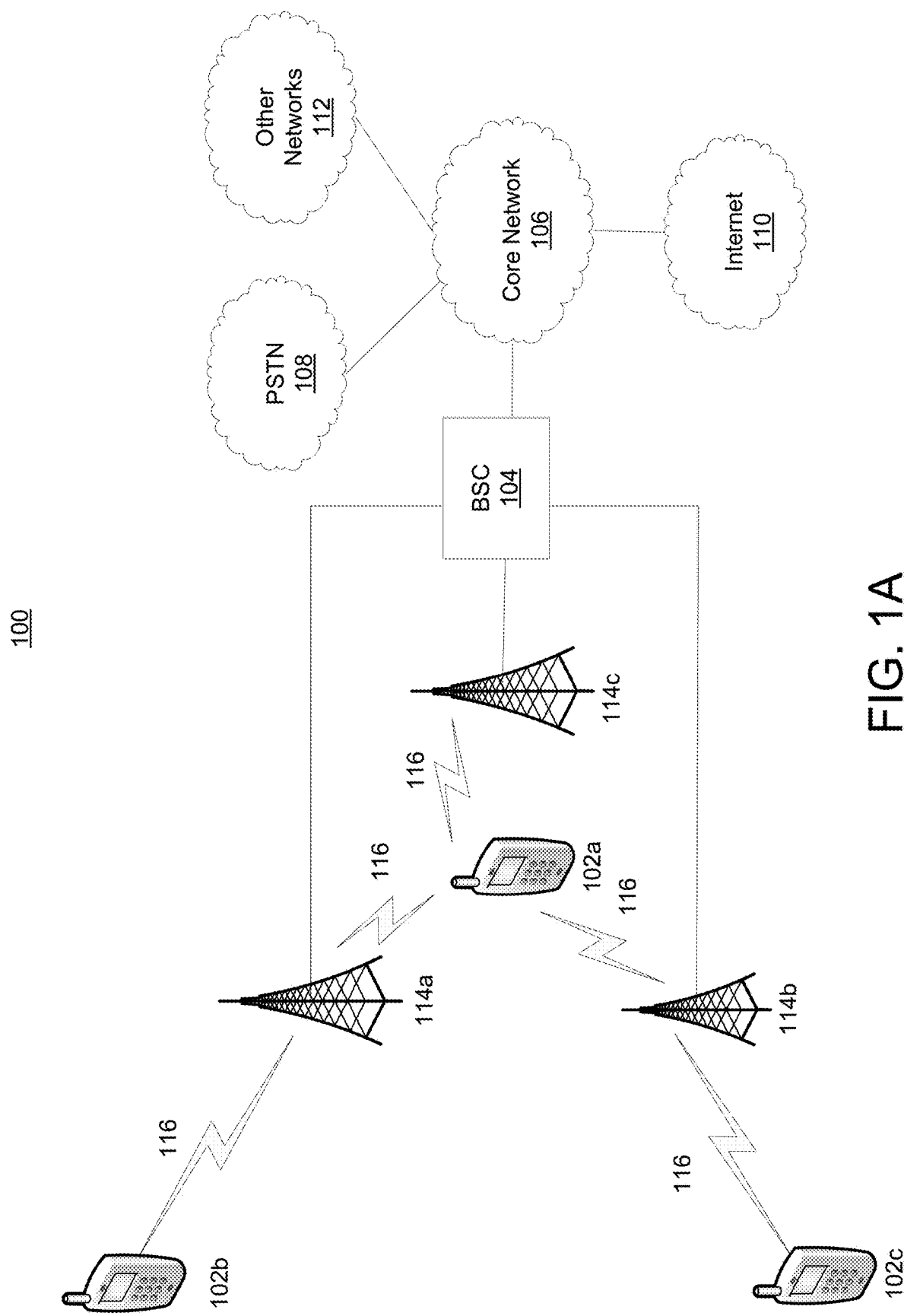
FIG. 1A is a diagram of an example communications system in which one or more disclosed embodiments may be implemented.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware. FIG. 1A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Although depicted in the example of FIG. 1A as a wireless communications system, a system in accordance with the presently disclosed subject matter may alternatively be implemented as a wired communications system based on embodiments and examples disclosed herein.

As shown in FIG. 1A, the communications system 100 may include wireless transmit/receive units (WTRUs) 102a, 102b, and 102c, a base station controller (BSC) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, and 102c may be any type of device configured to operate and/or communicate in a wireless environment. By way of example, the WTRUs 102a, 102b, and 102c may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. In an embodiment, WTRU 102a may employ multiple-input multiple-output (MIMO) technology and, therefore, may utilize multiple antennas and/or multiple transceivers per device.

The communications systems 100 may also include a base station 114a, a base station 114b, and a base station 114c. Each of the base stations 114a, 114b, and 114c may be any type of device configured to wirelessly interface with at least one of the WTRUs 102a, 102b, and 102c to facilitate access to one or more communication networks, such as the core network 106, the Internet 110, and/or the networks 112 through the BSC 104, although more than one BSC may also be used. By way of example, the base stations 114a, 114b, and 114c may be a base transceiver station (BTS), a Node-B, an eNode B, a Home Node B, a Home eNode B, a site controller, an access point (AP), a wireless router, and the like. While the base stations 114a, 114b, and 114c are each depicted as a single element, it will be appreciated that the base stations 114a, 114b, and 114c may include any number of interconnected base stations and/or network elements.

The base station 114c may be part of a radio access network, which may also include other base stations and/or network elements (not shown), such as a base station controller (BSC), a radio network controller (RNC), relay nodes, and the like. The base station 114c and/or the base stations 114a and 114c may be configured to transmit and/or receive wireless signals within a particular geographic region, which may be referred to as a cell (not shown). The cell may further be divided into cell sectors. For example, the cell associated with the base stations 114a, 114b, and 114c may each be divided into three sectors, or a different number of sectors. Thus, in one embodiment, a base station may include three transceivers, i.e., one for each sector of the cell. In another embodiment, the base station 114c may employ MIMO technology and, therefore, may utilize multiple antennas and/or multiple transceivers for each sector of the cell.

The base stations 114a, 114b, and 114c may communicate with one or more of the WTRUs 102a, 102b, and 102c over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base stations 114a, 114b, and 114c and the WTRUs 102a, 102b, and 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base stations 114a, 114b, and 114c, and the WTRUs 102a, 102b, and 102c may implement a radio technology such as Evolved UMTS Terrestrial Radio Access (E-UTRA), which may establish the air interface 116 using Long Term Evolution (LTE) and/or LTE-Advanced (LTE-A).

In another embodiment, the base stations 114a, 114b, and 114c, and the WTRUs 102a, 102b, and 102c may implement a frequency hopping radio technology such as Bluetooth of Zigby.

In other embodiments, the base stations 114a, 114b, and 114c, and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an example, the base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114c and the WTRUs 102a, 102b, and 102c may implement a radio technology such as IEEE 802.11 to establish a wireless local area network (WLAN). In another embodiment, the base station 114c and the WTRUs 102a, 102b, and 102c may implement a radio technology such as IEEE 802.15 to establish a wireless personal area network (WPAN). In yet another embodiment, the base station 114c and the WTRUs 102a, 102b, and 102c may utilize a cellular-based RAT (e.g., WCDMA, CDMA2000, GSM, LTE, LTE-A, etc.) to establish a picocell or femtocell. Any of the base stations may have a direct connection to the Internet 110. In the case of a direct connection to the Internet 110, a base station may not be required to access the Internet 110 via the core network 106.

The core network 106 may serve as a gateway for the WTRUs 102a, 102b, and 102c to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs.

Some or all of the WTRUs 102a, 102b, and 102c in the communications system 100 may include multi-mode capabilities, i.e., the WTRUs 102a, 102b, and 102c may include multiple transceivers for simultaneously communicating with different wireless networks over different wireless links. For example, the WTRU 102a shown in FIG. 1A may be configured to communicate with base station 114a, 114b, and 114c which may employ a cellular-based radio technology.

Figure 1B:
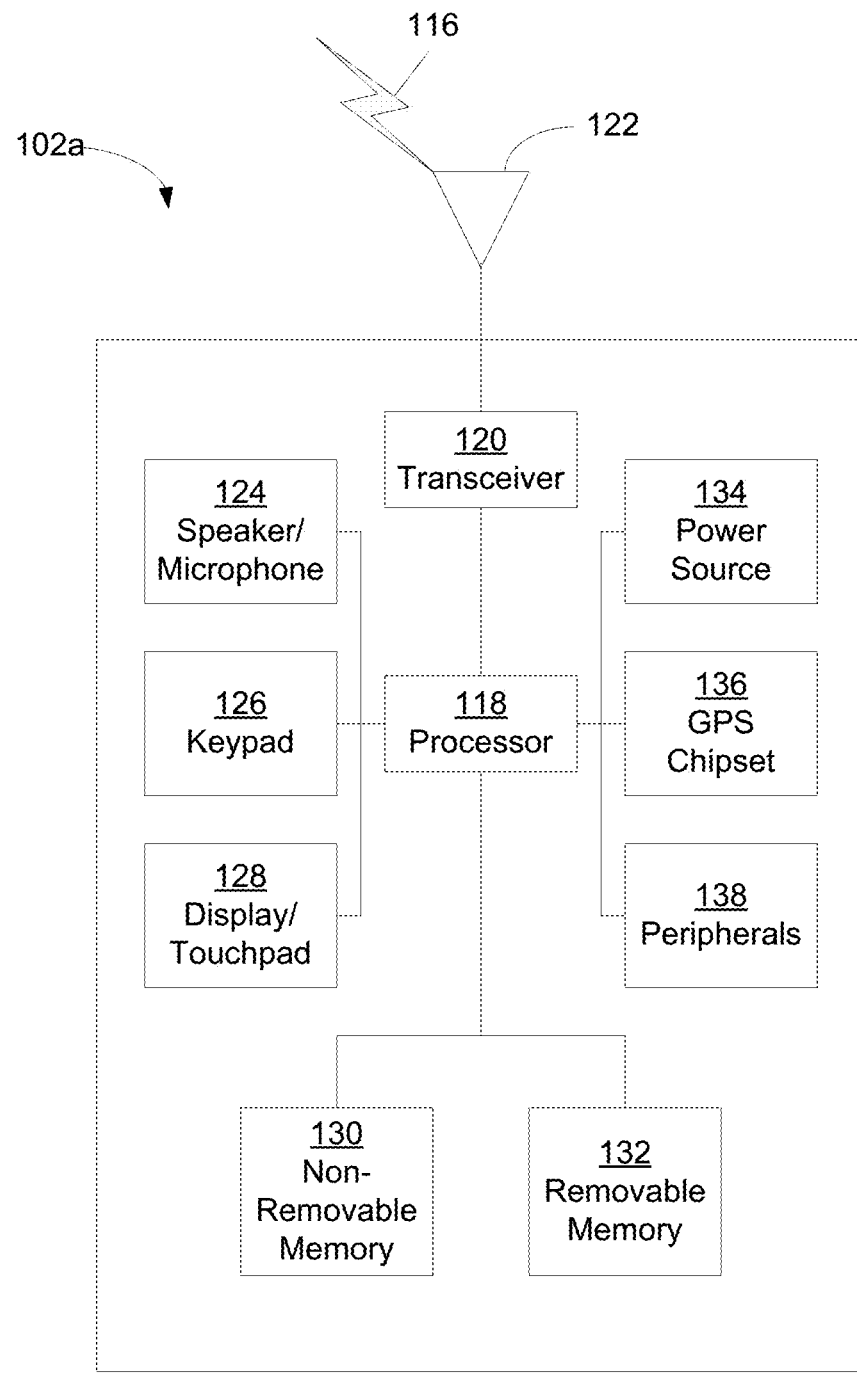
FIG. 1B is a system diagram of the example WTRU shown in FIG. 1A.

FIG. 1B is a system diagram of the example WTRU 102a shown in FIG. 1A. As shown in FIG. 1B, the WTRU 102a may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102a may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102a to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., base stations 114a, 114b, and 114c) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102a may include any number of transmit/receive elements 122. In one embodiment, the WTRU 102a may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102a may have multi-mode capabilities. Thus, the transceiver 120 may include multiple transceivers for enabling the WTRU 102a to communicate via multiple RATs, such as UTRA and IEEE 802.11, for example.

The processor 118 of the WTRU 102a may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102a, such as on a server or a home computer (not shown).

The processor 118 may receive power from the power source 134, and may be configured to distribute and/or control the power to the other components in the WTRU 102a. The power source 134 may be any suitable device for powering the WTRU 102a. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102a. In addition to, or in lieu of, the information from the GPS chipset 136, the WTRU 102a may receive location information over the air interface 116 from a base station (e.g., base stations 114a, 114b, and 114c) and/or determine its location based on the timing of the signals being received from two or more nearby base stations. It will be appreciated that the WTRU 102a may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a BLUETOOTH® module, a frequency modulated (FM) radio unit, a digital music player, a media player, a video game player module, an Internet browser, and the like.

In accordance with embodiments of the present disclosure, non-orthogonal dimensionality between multiple interfering signals is exploited. As referred to herein, "dimensionality" may refer to any differences between the multiple interfering signals that are able to be exploited by the receiver in order to aid the decoding process. This is in contrast to conventional methods that attempt to orthogonalize multiple signals in time, frequency, spreading code, or space so they do not interfere. The present disclosure instead is directed to cases where the interfering signals either cannot be orthogonal or orthogonality is not desirable from a system design perspective. Instead the dimensionality between the signals occurs so as that they are not orthogonal but instead to exploit the receiver which is able to separate signals partially or fully through the created dimensions. Accordingly, adding a level of non-orthogonal dimensionality between signals as used herein is said to "differentiate" one signal from another. Similarly, when any of the terms "differentiate," differentiates," or "differentiated" is used with respect to signals, it is intended to refer to an increase in non-orthogonal dimensionality between signals. When there is greater dimensionality between two or more interfering signals, receivers designed to process interfering signals perform with increased accuracy and speed.

Receivers with MUD capabilities benefit from greater non-orthogonal dimensionality between two or more interfering signals, since MUD is a receiver design technology for detecting desired signal(s) from interference and noise. MUD works by exploiting dimensionality between multiple interfering signals. The dimensionality may occur naturally between interfering signals but may also, as an aspect of the subject matter described herein, be purposely introduced in order to create advantageous situations for the MUD. The dimensionality can take the form of any difference between the received signals that can be exploited by the MUD to more reliably decode the interfering signals. As an aspect of the subject matter described herein, power, symbol phase, and timing of an interfering transmitter or transmitters can be adjusted in order to improve MUD performances in decoding the interfering signals. In many instances, where there is a lack of or sub-optimal dimensionality between the multiple interfering signals received by the MUD receiver, and as an aspect of the subject matter described herein, better MUD receiver performance may be obtained by introducing dimensionality between the interfering signals.

Multiple-input and multiple-output (MIMO) decoding techniques also benefit from greater non-orthogonal dimensionality between two or more interfering signals. Generally speaking, MIMO involves the use of multiple antennas at both the transmitter and receiver to improve communication performance through significant increases in data throughput and link range without additional bandwidth or increased transmit power. It achieves this goal by spreading the same total transmit power over the antennas to achieve an array gain that improves the spectral efficiency and/or to achieve a diversity gain that improves the link reliability. As an aspect of the subject matter described herein, power, symbol phase, and timing of an interfering transmitter or transmitters can be adjusted in order to improve MIMO performances in decoding the interfering signals. In many instances, where there is a lack of or sub-optimal dimensionality between the multiple interfering signals received by the MIMO receiver, and as an aspect of the subject matter described herein, better MIMO receiver performance may be obtained by introducing dimensionality between the interfering signals.

Figure 2:
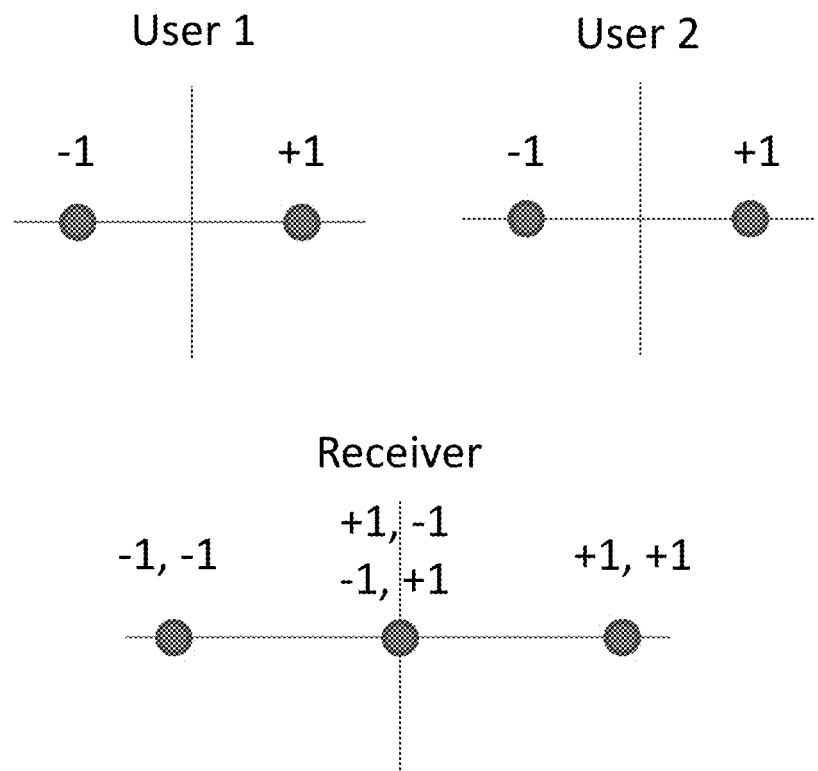
FIG. 2 depicts two BPSK users' constellations as seen by a receiver as well as the superposition of those constellations, which occurs in the receiver's antenna.
Figure 3:
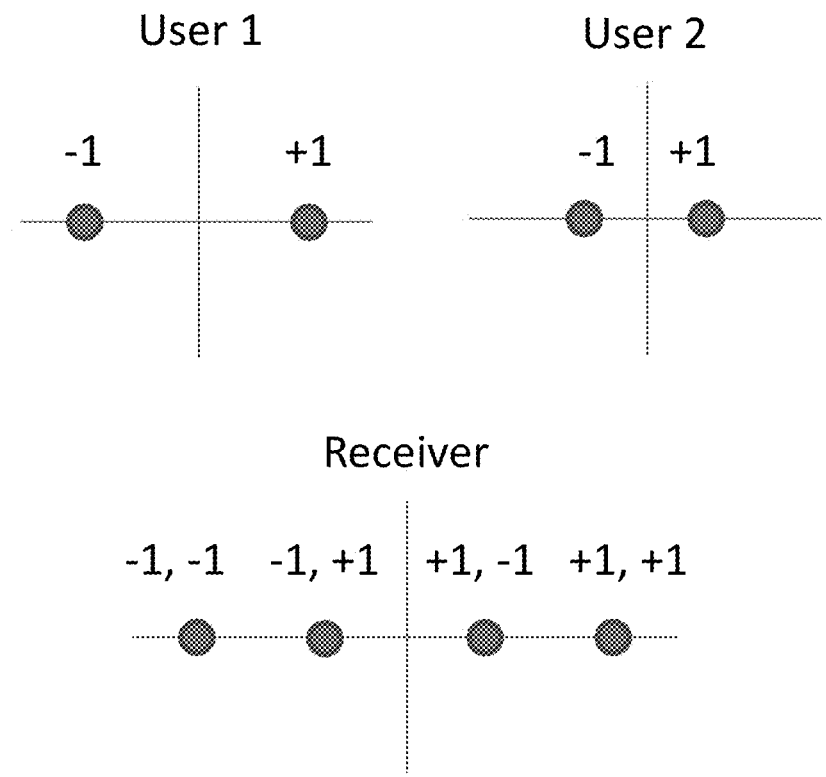
FIG. 3 depicts user two's power being reduced to add the dimensionality.

As a conceptual example of adding non-orthogonal dimensionality between signals, a particular receiver may receive two data streams that have no dimensionality between those signals. No dimensionality implies that there is a single antenna, no power offset, symbol phase offset, coding, or the like as depicted in FIG. 2. FIG. 2 depicts two BPSK users' constellations as seen by a receiver as well as the superposition of those constellations, which occurs in the receiver's antenna. Since there is no dimensionality between the signals, the two users cannot be decoded even for an optimal receiver. When dimensionality is added, as shown in FIG. 3, both signals can now be decoded at the receiver. FIG. 3 depicts user two's power being reduced to add the dimensionality.

Figure 4:
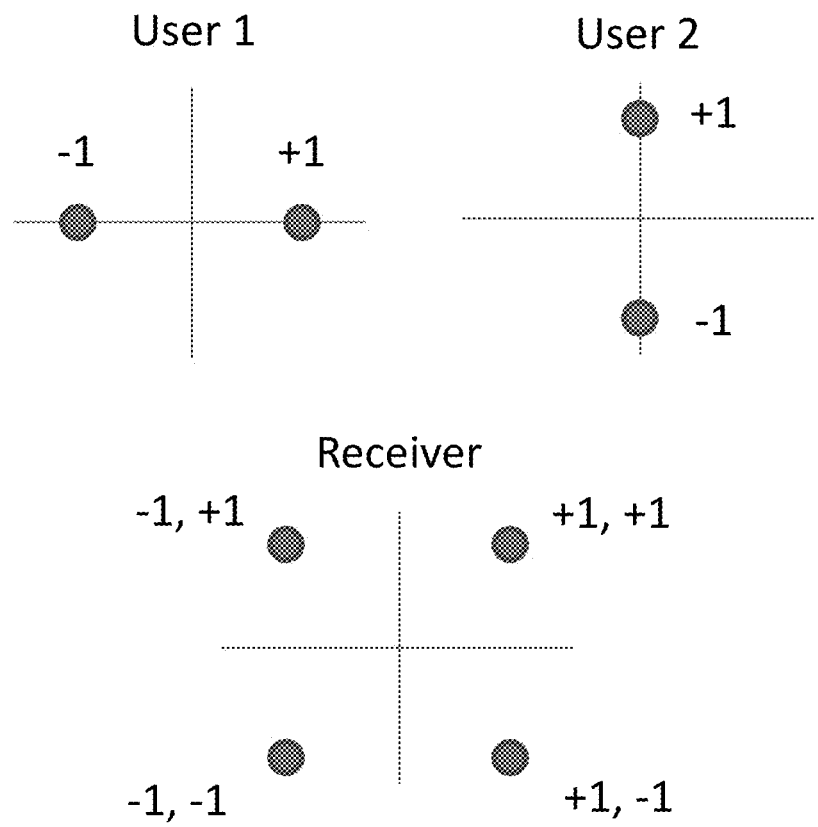
FIG. 4 depicts a scenario that uses phase offset in a symbol synchronous case as dimensionality between the signals.

The phase of the received signals additionally can be used to create dimensionality between the signals by inducing a phase offset between the received signals. FIG. 4 depicts a scenario that uses phase offset in a symbol synchronous case as dimensionality between the signals. In this case, a phase offset of one or both users' constellations such that they arrive at the receiver with a 90 degree offset, hence making it easier to decode. It is noted that a 90 degree offset may not always be optimal depending on the modulation scheme, the number of received signals, or another number of other factors. For example, if each signal, of two signals, is a QPSK modulated signal, then a 45 degree offset may be more appropriate.

Another example form of dimensionality that a receiver can utilize is symbol asynchrony. Symbol asynchrony can be induced by instructing certain transmitters to transmit with a time adjustment. This control is already in place in many existing networks. Note that in a symbol synchronous network, some level of symbol asynchrony would be purposely introduced.

In another example, scheduling may also be used to create the desired dimensionality in power and phase between the multiple data streams in order to aid the decoding process. In particular, signals may be purposely scheduled to interfere with each other on a particular frequency because their phase and power parameters already have dimensionality between them—doing such makes capacity available on other frequencies. Due to the ability to select from many data streams and the natural variations in received power and phase offsets that occur due to channel fading, users can be scheduled in a manner so that there is sufficient power and phase separation between interfering signals. The fading phenomenon is especially prevalent in narrowband communication systems or wideband communication systems that subdivide its bandwidth such as OFDM, OFDMA, SC-FDMA and any other "subbanded" systems.

In accordance with embodiments of the present disclosure, two or more available dimensions may be jointly optimized. An increased level of performance can be obtained by attempting to force power and phase separations, as well as other factors that affect the level of performance. These other factors include but are not limited to the channel, modulation rate, and coding rate. Maximization of performance is dependent on many factors and changes depending on, for example, the MUD technique used.

An example use of the presently disclosed subject matter is to increase performance in group detection techniques. Group detection algorithms decrease the complexity of the receiver by grouping users so that the decoder can operate on fewer than all of the data streams at a time. There are various grouping techniques from the easiest which is to arbitrary pick a certain number of streams to more complicated techniques such as minimizing the error vector magnitude using a linear detector. Having the data streams arrive at the receiver with different power levels aids the grouping process. Note that depending on the grouping technique chosen; separating the users in power does not necessarily amount to power ordering of users. Hence, the solution that maximizes the performance may not be simply power ordering. As previously mentioned the optimal grouping will include a combination of other factors and the decoding technique. Hence, specific data streams may be directed to change power level based partly on other factors, such as spatial correlation, modulation, coding, spreading length, etc.

Various embodiments of using dimensionality to increase decoding performance are disclosed below. Note that each of these techniques may involve attempting to control the received power at a specific instant in time or averaged over some time; attempting to separate the power and/or phase of groups of users, i.e., a grouping of user signals arrive spaced within a set power range; attempting to linearly space the power of users; and attempting to exponentially space the power of users.

In accordance with embodiments of the present disclosure, group detection may be used as an intra-cell and inter-cell decoder. An example case of the group detection is to group users with knowledge of which cells they belong to as a method of grouping. In this case, explicit knowledge of the received powers/phases may not be available, especially in the case of data streams from other cells.

The best phase offset mechanism depends heavily on elements of the system/scenario. In this case, here "spacing in phase" does not necessarily refer to 0 to 360 degrees, instead it refers to between two unspecified [angle] values. Specific uses of phase dimensionality that are imposed to aid the detector may be: linear spacing in phase; logarithmic or exponential spacing in phase; and purposely causing phase rotation on the transmitter to provide a uniform distribution of phase offset amongst the various signals.

Another example use of the presently disclosed subject matter is for non-hub and spoke networks. In this case, the scheduling and power/phase control must be acceptable at multiple different receivers. The scheduling and power/phase control may be determined at multiple different locations or in a centralized fashion. Scheduling and power/phase control may arrive from multiple different sources from multiple different directions and with different measurements, such as the case in ad hoc networks or with adjacent cells.

Another use of the presently disclosed subject matter is to use the information from the decoding process to continue to iterate on the parameters rather than from a module built specifically for parameter estimation. This may be in the form of blindly trying to adjust parameters until they are successful or using specific measurements out of the decoder to intelligently adjust the parameters.

Dimensionality may be physically accomplished through feedback from one or more receivers. The receiver may estimate the parameters of the received signals, determine an adjustment in parameters of one or more of the received signals that would result in greater dimensionality between the received signals, and feed the parameter adjustments back to the transmitters, using whatever feedback mechanism is in place. The parameter estimates can take place anywhere in the receiver but are typically from a parameter estimation module or are an output of the decoding process in the detector. As previously mentioned, many networks have mechanisms to adjust the amplitude and/or phase of the transmissions but do so for other reasons. In these networks, that algorithm in the receiver that controls the amplitude and/or phase of the transmitted signal would be modified to include optimizing the dimensionality for the multi-user detector. A joint optimization is likely to be performed that balances the needs of multiple goals. As an example, an optimization of power may be a balance of adjusting the power of the transmitters, as received by the receiver, to be diverse so as to increase the MUD performance, but to not be too diverse (and in particular, so as not to be transmitting with too high of a power level) such that the transmissions are negatively impacting adjacent cells through intercell interference. All of the control and decision making for the feedback may also originate from higher level logic devices that are possibly removed from the physical receiver.

In an example, in a cellular network where various terminals communicate to a base station, that base station may have a MUD receiver based on grouping users, i.e., the MUD does not jointly decode all users, but rather groups them first and jointly decodes those users. This method is typically used to reduce the complexity of the receiver. Suppose further that the MUD with grouping performs better when all users in a particular group transmit at a power within a set power range but that power range is separated from the power ranges from other groups. For the sake of example and without the loss the generality, suppose a MUD is used that groups users into groups of 2 and that the error is minimized when the groups have powers separated by 3 dB. The base station measures the power through a parameter estimation module and continuously adjusts the power of at least one of the terminals so that it arrives at the desired power. It is noted that the performance of the hypothetical group MUD may depend on all dimensions rather than just power and therefore must be taken into account to maximize performance.

Many MUDs also perform best with phase dimensionality between the received signals. Using the same example of a base station and terminals, the base station may attempt to only schedule users with acceptable symbol phase offsets. Additionally, it may instruct the terminals to induce a symbol phase offset or time delay to induce symbol asynchrony upon transmission.

In accordance with this embodiment, MUD based detectors within a cellular network may be aided. Most modern cellular networks use power control to attempt to force all users to arrive at the base station at the same power. As an aspect of the subject matter described herein, the cellular network may instruct transmitters to transmit at differing power levels (as received by the base station receiver), hence aiding with MUD without having significant impact to the network. In an example, the power of the users may be linearly separated in dB or whatever is optimal for the particular MUD algorithm. The decision to schedule users may be determined through a combination of power levels and other dimensionality factors.

Figure 5:
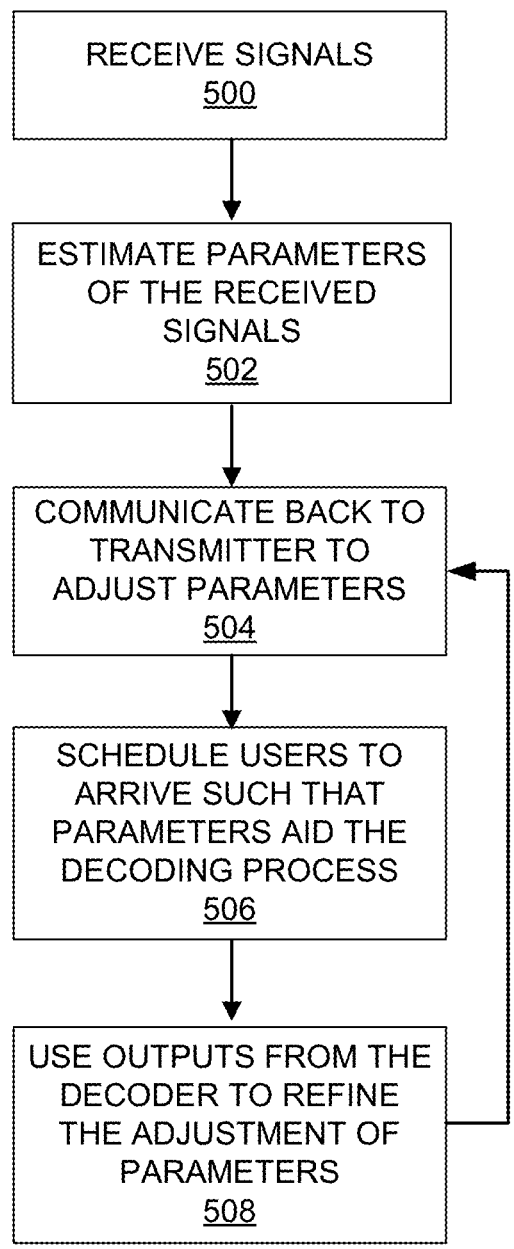
FIG. 5 is a flowchart of an example method according to embodiments of the present disclosure.

In an exemplary embodiment illustrated by FIG. 5, a receiver of a cellular network system receives transmissions from two or more transmitters, where the transmitters are both transmitting to the receiver (that is, they are "in" the receiver's cell) and the transmitters are transmitting simultaneously on the same frequency or channel (step 500). The receiver, using its MUD capabilities, detects the transmissions from the transmitters and conducts parameter estimation on the transmissions (step 502). The receiver may analyze the parameter estimations of the transmissions and determine that certain transmission parameters (e.g., power levels and phase) of certain transmitters, if adjusted, could result in more optimally spaced parameters for reception and decoding by the receiver. In particular, by determining that adjusting a parameter of a transmitter to be more optimally spaced from that of at least one other transmitter, the receiver may determine that a larger phase shift should exist between the at least two transmitters, or that a larger difference in power levels (as received by the receiver) should exist between the at least two transmitters. In an embodiment, the receiver determines the parameter adjustments for the transmitters by determining the parameters that would result in non-orthogonal dimensionality between the signals to increase the likelihood that the receiver will be able to separate those signals. This determined set of parameter adjustments may only apply to one of the transmitters, or may apply to multiple transmitters. The receiver communicates to the transmitter(s) the parameter adjustments to adjust the parameters (step 504). The one or more transmitters are scheduled to transmit, and likely continually transmit since they now are separable, with parameters that add dimensionality to differentiate the signals that arrive at the receiver to aid in the decoding process without making the signals orthogonal (step 506). The parameter adjustments are updated based on the output of the decoder or other metrics to ensure future transmissions are also separable (step 508). The receiver communicates to the transmitter(s) instructions to implement the updated adjustments for future transmissions (step 504). In an embodiment, a greater dimensionality that results in improved MUD performance is sought, but not at the cost of intercell interference at adjacent cells, nor at the cost of requiring at least one transmitter to transmit at a power level that strongly consumes its battery resources.

In another embodiment, the receiver may instruct certain transmitters to transmit on alternative frequencies or channels or time slots, and instruct alternative transmitters (that previously were on alternative frequencies or channels or time slots) to transmit on this particular frequency or channel or time slots based on the parameter estimations of those transmitters.

In another embodiment, in a situation where at least one of the transmissions is from a transmitter that is not "in" the receiver's cell, the receiver determine which transmitters are "in" its cell and optimizes the parameter adjustments for only those transmitters in light of the transmission parameters of the transmitter that is not "in" the receiver's cell.

In another embodiment, in a situation where at least one of the transmissions is from a transmitter that is not "in" the receiver's cell, the multiple cells may communicate with each other to come up with a joint solution to changing the transmissions parameters and communicate the transmission parameters through one or more cells.

Figure 6:
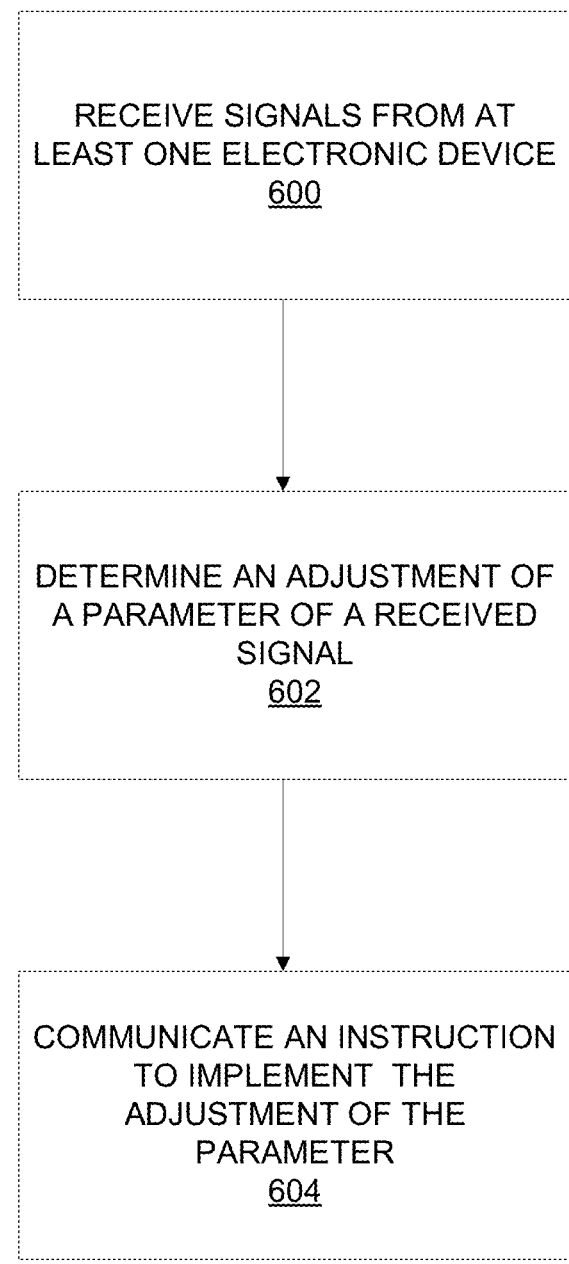
FIG. 6 illustrates a flow chart of an example method for receiving signals from different electronic devices, such as WTRUs, and for communicating signaling adjustment information to one or more of the electronic devices for distinguishing the signals in accordance with embodiments of the present subject matter.

FIG. 6 illustrates a flow chart of an example method for receiving multiple signals one or more electronic devices, such as WTRUs, and for communicating signaling adjustment information to one or more of the electronic devices for distinguishing the signals in accordance with embodiments of the present subject matter. The example method may be implemented by a suitable base station, such as the base station 114*a*, configured with multi-user detection capabilities as disclosed herein. One or more other system components, such as the components shown in FIG. 1A, may be used together with the base station to implement the steps of this example method. This example is described by use of the base station 114a; however, any suitable base station or other electronic device operating in any suitable network may be utilized.

In the example of FIG. 6, one or more wireless sources may transmit to the base station 114a multiple interfering signals. For example, WTRUs 102a and 102b may each transmit signal data on the air interface 116 or WTRUs 102a may transmit multiple signals, such as in a MIMO arrangement where the WTRU has multiple transmit antennas. Examples of the signal data include video, one or more images, any type of multimedia content, the like, any type of data, and combinations thereof. The signal data may be transmitted on the same or different channels. For example, the signal data may be transmitted from the WTRUs 102a and 102b on the same frequency and at the same time interval.

Referring to FIG. 6, the method includes receiving signals from at least one electronic device (step 600). For example, the electronic device(s) may be a WTRU, user equipment (UE), a mobile station, a fixed subscriber unit, a mobile subscriber unit, a cellular telephone, a personal digital assistant (PDA), a smartphone, a laptop, a netbook, a personal computer, a wireless sensor, or a consumer device. The signals may arrive at a receiver with the signals partially or fully overlapping in time and frequency.

The method of FIG. 6 includes determining an adjustment of a parameter of a received signal of a first device that would result in an adjusted signal that is not orthogonal but differentiates the signal from at least one other signal of the received signals (step 602). For example, the parameter of the signal may be estimated. An adjustment may be of one or more of a symbol phase, power level, channel, modulation rate, coding rate, timing, and the like. An adjustment may be made such that the adjustment results in the phase of the signal of an electronic device being different than the phase of the signals of other electronic devices. A power level may be adjusted such that the adjustment results in the power level of the signal of an electronic device being different than the power level of one or more signals of other electronic devices as seen by the receiver.

The method of FIG. 6 includes communicating, to the first device, an instruction to implement the adjustment of the parameter (step 604). For example, the base station 114a may communicate adjustments to WTRU 102b for implementation by the WTRU 102b. Further, the receiver may decode the signals based on a suitable MUD technique.

Figure 7:
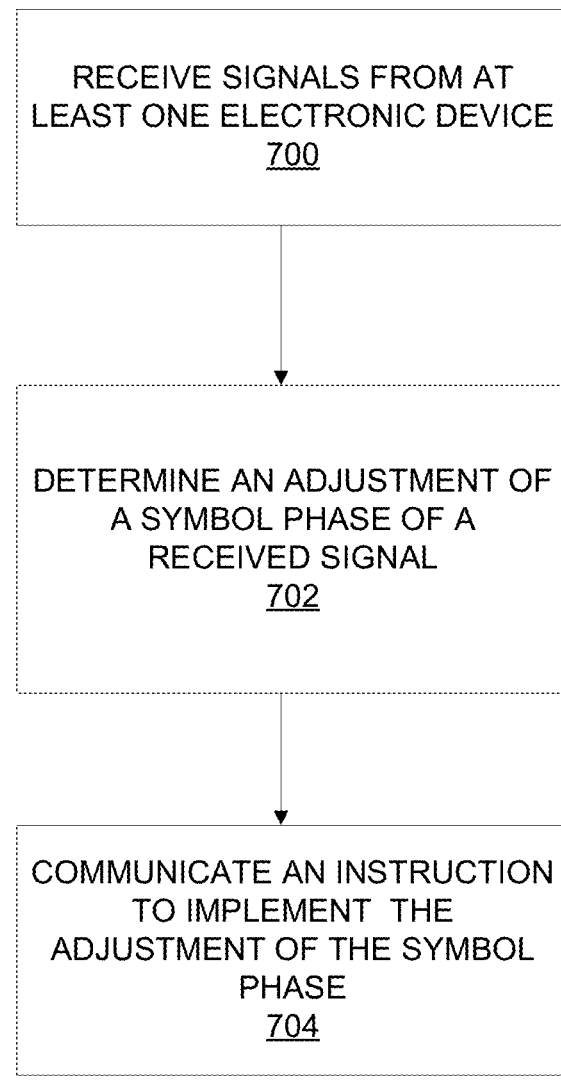
FIG. 7 illustrates a flow chart of another example method for receiving signals from different electronic devices, such as WTRUs, and for communicating signaling adjustment information to one or more of the electronic devices for distinguishing the signals in accordance with embodiments of the present subject matter.

FIG. 7 illustrates a flow chart of another example method for receiving signals from different electronic devices, such as WTRUs, and for communicating signaling adjustment information to one or more of the electronic devices for distinguishing the signals in accordance with embodiments of the present subject matter. The example method may be implemented by a suitable base station, such as the base station 114a, configured with multi-user detection capabilities as disclosed herein. One or more other system components, such as the components shown in FIG. 1A, may be used together with the base station to implement the steps of this example method. This example is described by use of the base station 114a; however, any suitable base station or other electronic device operating in any suitable network may be utilized.

In the example of FIG. 7, different wireless sources may transmit to the base station 114a multiple interfering signals. For example, WTRUs 102a and 102b may each transmit signal data on the air interface 116. Examples of the signal data include video, one or more images, any type of multimedia content, the like, any type of data, and combinations thereof. The signal data may be transmitted on the same or different channels. For example, the signal data may be transmitted from the WTRUs 102a and 102b on the same frequency and at the same time interval.

Referring to FIG. 7, the method includes receiving signals from at least one electronic device (step 700). For example, the signals may arrive at a receiver with the signals partially or fully overlapping in time and frequency.

The method of FIG. 7 includes determining an adjustment of a symbol phase of a received signal of a first device that would result in an adjusted signal that is not orthogonal but differentiates the signal from at least one other signal of the received signals (step 702). In addition, an adjustment may also be determined for one or more of a power level, channel, modulation rate, coding rate, timing, and the like. An adjustment may be made such that the adjustment results in the phase of the signal of an electronic device being different than the phase of the signals of other electronic devices. A symbol phase and/or other parameter may be adjusted such that the adjustment results in the symbol phase and/or other parameter of the signal of an electronic device being different than the parameter of one or more signals of other electronic devices as seen by the receiver.

The method of FIG. 7 includes communicating, to the first device, an instruction to implement the adjustment of the symbol phase (step 704). For example, the base station 114a may communicate adjustments to WTRU 102b for implementation by the WTRU 102b. Further, the receiver may decode the signals based on a suitable MUD technique.

Similar to the method described with respect to FIGS. 6 and 7, in an example the adjustment may be determined based on one or both of a symbol phase and a power of a signal of one or more electronic devices for use in differentiating received signals. An instruction can be provided to one or more of the electronic devices for adjustment of the signals such that the signals can be differentiated.

Figure 8:
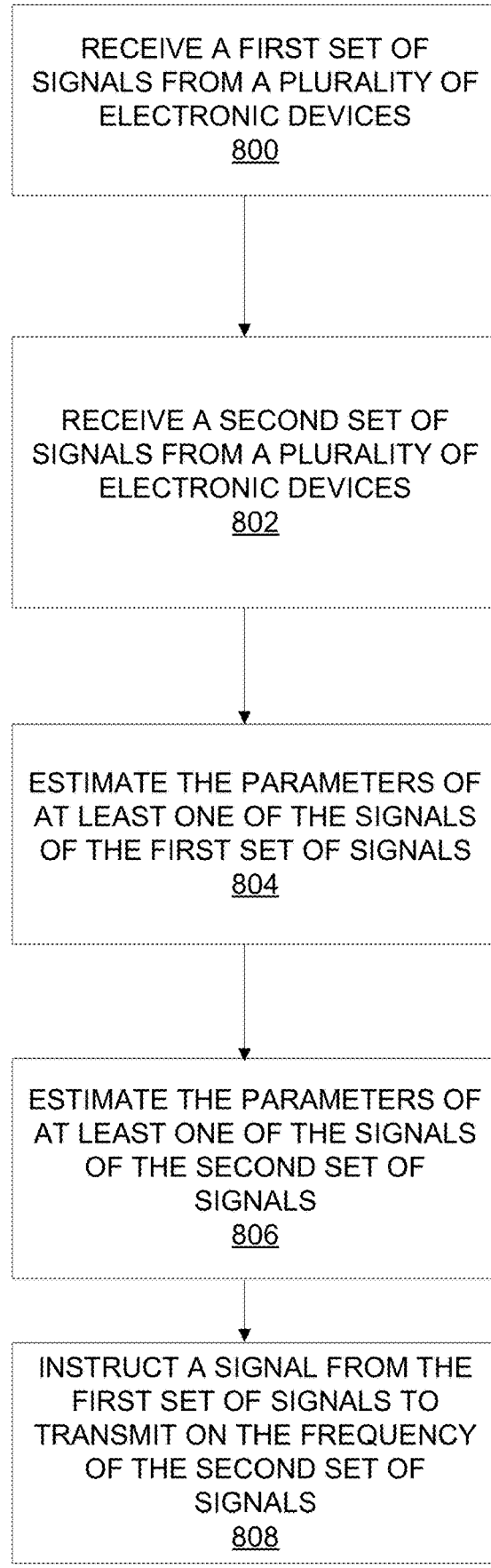
FIG. 8 illustrates a flow chart of another example method for receiving signals from different electronic devices, such as WTRUs, and for communicating signaling adjustment information to one or more of the electronic devices for distinguishing the signals in accordance with embodiments of the present subject matter.

FIG. 8 illustrates a flow chart of another example method for receiving signals from different electronic devices, such as WTRUs, and for communicating signaling adjustment information to one or more of the electronic devices for distinguishing the signals in accordance with embodiments of the present subject matter. The example method may be implemented by a suitable base station, such as the base station 114a, configured with multi-user detection capabilities as disclosed herein. One or more other system components, such as the components shown in FIG. 1A, may be used together with the base station to implement the steps of this example method. This example is described by use of the base station 114a; however, any suitable base station or other electronic device operating in any suitable network may be utilized.

The method of FIG. 8 includes receiving a first set of signals from a plurality of electronic devices (step 800). The signals are transmitted at the same time and on substantially the same frequency or an overlapping frequency.

The method of FIG. 8 includes receiving a second set of signals from a plurality of electronic devices (step 802). The signals are transmitted on a different frequency than the first set of signals.

Further, the method of FIG. 8 includes estimating the parameters of one or more of the signals of the first set of signals (step 804). The method also includes estimating the parameters of one or more of the signals of the second set of signals (step 804). A receiver may determine whether one or more parameters of a signal from the first set of signals is more diverse with those of the second set of signals than with those of the first set of signals. In response to determining that it is more diverse, the electronic device transmitting the signal may be communicated that instructs the electronic device to transmit on the frequency of the second set of signals.

The subject matter described herein may be implemented in alternative wireless environments besides cellular environments, including ad hoc networks, mesh networks, and alternative hub-and-spoke type networks. These alternative wireless networks, as examples, could include 802.11 networks, Bluetooth networks, Zigbee networks, Satellite communication networks, and many others.

Further, it will be appreciated that the various techniques described herein may also be applied to wired environments instead of wireless environments. As an example, the techniques described herein may be applied to cable networks, where the base-station described herein is the head-end or an optical node, and where the WTRUs are terminal units on the cable network such as cable-modems. In such an embodiment, multiple cable modems would be permitted, if not instructed, to transmit signals on interfering frequencies on the cable network to the node or head-end (whichever the case may be). It should be appreciated that a WTRU may receive transmissions on a different type of network than on which it transmits on, and as such the 'Transmit' and 'Receive' aspects of the WTRU may be distinct components of the WTRU rather than a single transceiver. For example, a WTRU may receive parameter adjustment instructions on its 802.11 receiver for adjusting transmission parameters of its cellular transmitter.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for creating non-orthogonal dimensionality between signals, the method comprising:

receiving signals from at least one electronic device;

determining an adjustment of a modulation rate of a received signal of a first device of the at least one electronic device that would result in an adjusted signal that is not orthogonal but differentiates the received signal from at least one other signal of the received signals; and communicating, to the first device, an instruction to implement the adjustment of the modulation rate.

2. A method for creating non-orthogonal dimensionality between signals, the method comprising:

receiving signals from at least one electronic device;

determining an adjustment of a transmit symbol timing of a received signal of a first device of the at least one electronic device that would result in an adjusted signal that is not orthogonal but differentiates the received signal from at least one other signal of the received signals; and communicating, to the first device, an instruction to implement the adjustment of the transmit symbol timing.

3. A method for creating non-orthogonal dimensionality between signals, the method comprising:

receiving signals from at least one electronic device;

determining an adjustment of a coding rate of a received signal of a first device of the at least one electronic device that would result in an adjusted signal that is not orthogonal but differentiates the received signal from at least one other signal of the received signals; and communicating, to the first device, an instruction to implement the adjustment of the coding rate.

\* \* \* \* \*